Feb. 18, 1958 D. B. SPALDING 2,823,519
REVOLVING FUEL VAPORIZER AND COMBUSTION STABILIZER
Filed Feb. 5, 1951 5 Sheets-Sheet 1
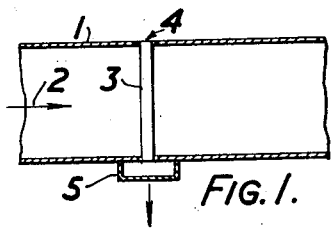
FIG. 1.
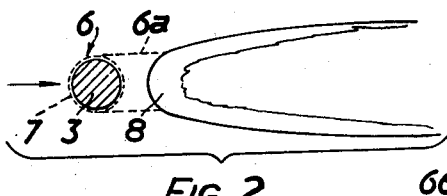
FIG. 2.
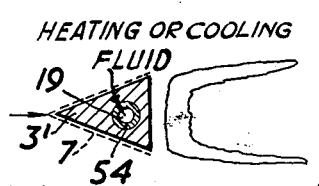
FIG. 3.
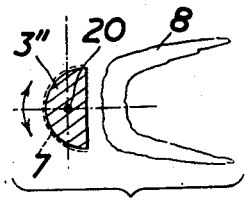
FIG. 4.
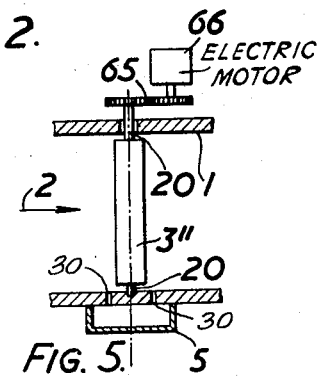
FIG. 5.
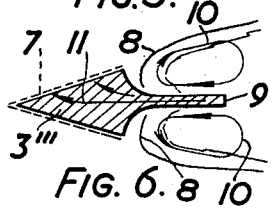
FIG. 6.
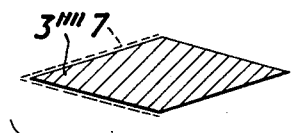
FIG. 7.
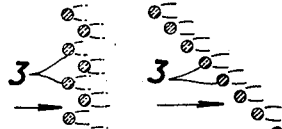
FIG. 8a. FIG. 8b. FIG. 8c.
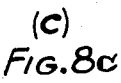
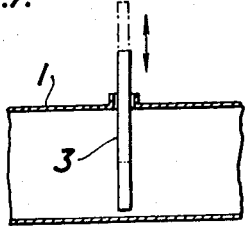
FIG. 9.
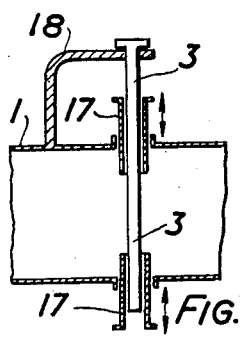
FIG. 10.
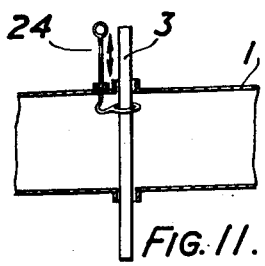
FIG. 11.
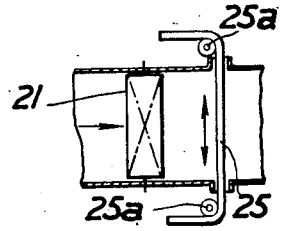
FIG. 12.
INVENTOR
Dudley B. Spalding
BY
Stevens, Davis, Miller & Mosher
ATTORNEY Feb. 18, 1958　　　D. B. SPALDING　　　2,823,519
REVOLVING FUEL VAPORIZER AND COMBUSTION STABILIZER
Filed Feb. 5, 1951　　　　　　　　　　　　5 Sheets-Sheet 2

INVENTOR
Dudley B. Spalding
BY
Stevens, Davis,
Miller & Mosher
ATTORNEY

Feb. 18, 1958   D. B. SPALDING   2,823,519
REVOLVING FUEL VAPORIZER AND COMBUSTION STABILIZER
Filed Feb. 5, 1951   5 Sheets-Sheet 3
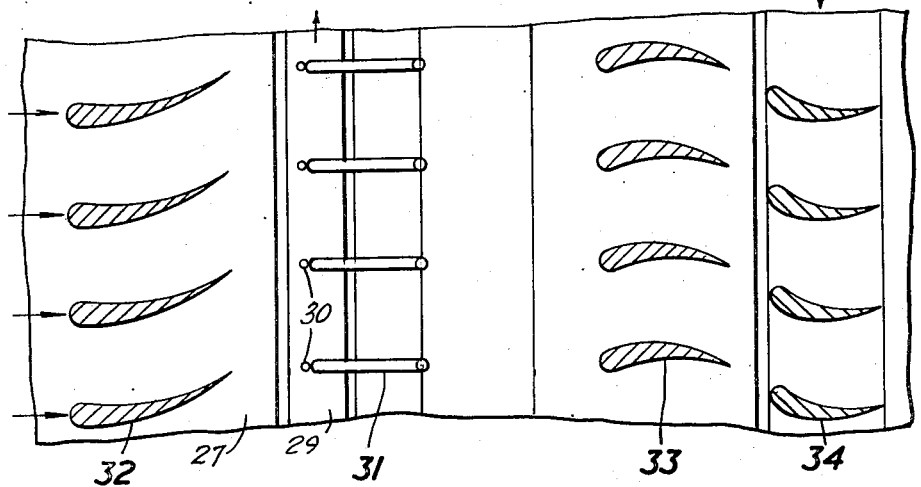
FIG. 15.
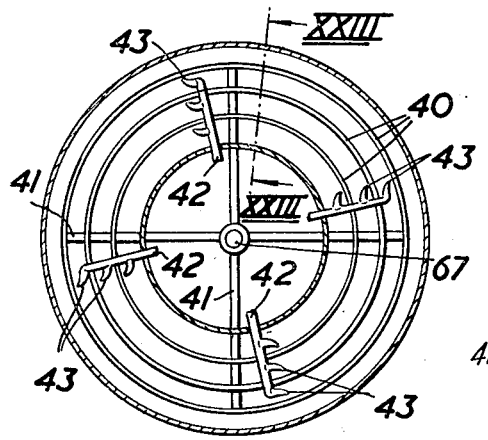
FIG. 22.
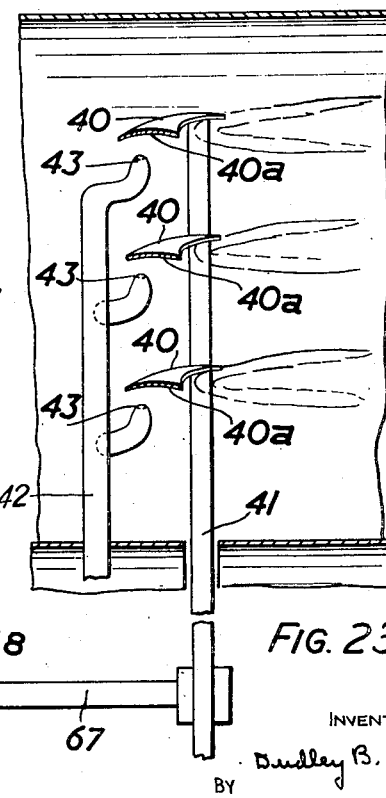
FIG. 23.
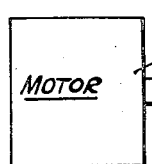
INVENTOR
Dudley B. Spalding
BY
Stevens, Davis, Miller & Mosher
ATTORNEY Feb. 18, 1958   D. B. SPALDING   2,823,519
REVOLVING FUEL VAPORIZER AND COMBUSTION STABILIZER
Filed Feb. 5, 1951   5 Sheets-Sheet 5
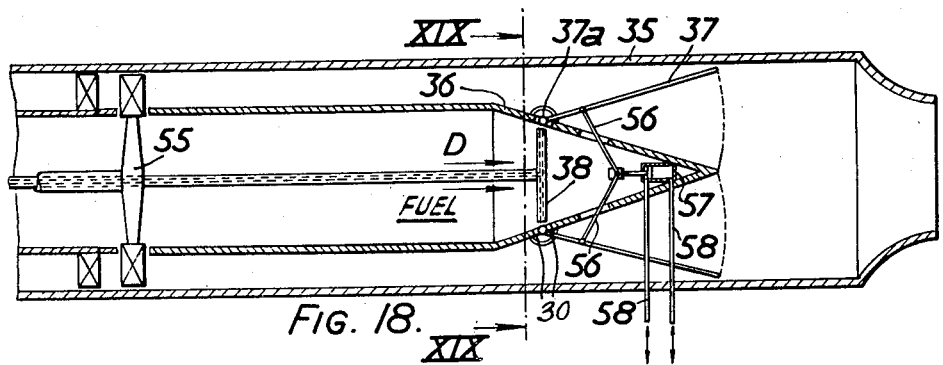
FIG. 18.
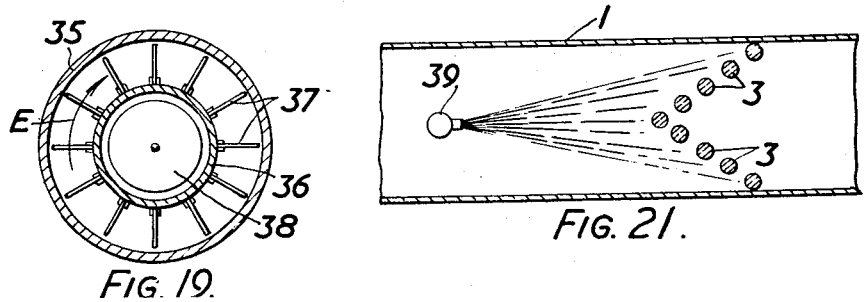
FIG. 19.
FIG. 21.
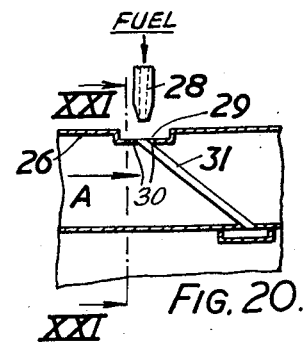
FIG. 20.
INVENTOR
Dudley B. Spalding
BY
Stevens, Davis, Miller & Mosher
ATTORNEY United States Patent Office 2,823,519
Patented Feb. 18, 1958

2,823,519

REVOLVING FUEL VAPORIZER AND COMBUSTION STABILIZER

Dudley B. Spalding, Cambridge, England

Application February 5, 1951, Serial No. 209,378

Claims priority, application Great Britain February 14, 1950

11 Claims. (Cl. 60—39.71)

This invention relates to apparatus for burning liquid fuel in a ducted stream of combustion-supporting gas.

The invention is specially, but not exclusively, applicable in circumstances where the velocity of the gas stream is high, as is the case for example in continuous combustion gas turbine plant, or in propulsive duct apparatus (ramjets). According to the present invention apparatus for burning liquid fuel in a ducted stream of combustion-supporting gas, comprises a duct defining a path for the said stream, at least one elongated vaporizer body in the duct arranged lengthwise across the said duct, the said body presenting an unstreamlined profile to the oncoming gas so that a turbulent wake is created in the rear of the body, and means for continuously supplying fuel to wet the external surface of the said body whereby, when gas is flowing in the duct, fuel evaporates from a wet film continuously maintained on the body and when ignited, burns only in the said turbulent wake.

In order to assist understanding of the invention various specific embodiments of it will now be described by way of example and with reference to the accompanying drawings which are of purely diagrammatic nature. In the drawings:

Figure 1 is a longitudinal section through a cylindrical combustion duct.

Figures 2 to 4 and 6 are transverse sections through a vaporizer rod, each figure showing a different type of cross-sectional shape.

Figure 5 is a longitudinal section through a cylindrical combustion duct containing the vaporizer rod shown in Figure 4.

Figure 7 shows an unsuitable section of vaporizer rod.

Figures 8a, 8b and 8c illustrate three possible arrangements of a series of vaporizer rods.

Figure 9 is a longitudinal section through a cylindrical combustion duct having a longitudinally slidable vaporizing rod or rods.

Figure 10 is a similar view but shows the provision of adjustable sheath elements slidable over the rod.

Figure 11 shows the provision of scraper means for removing carbon deposits from the rod or rods.

Figure 12 shows a construction which employs a vaporizer rod or rods each of which consists of a flexible filament.

Figure 15 is a fragmentary circumferential development on the line XV—XV in Figure 14.

Figure 18 is a longitudinal section through the tail pipe of a gas turbine engine having reheat equipment according to the invention.

Figure 19 is a transverse section on the line XIX—XIX in Figure 18.

Figure 20 is a half-section of a modified annular combustion system.

Figure 21 illustrates an alternative means of fuel introduction.

Figure 22 is a transverse section through another form of annular system.

Figure 23 is a section on the line XXIII—XXIII of Figure 22.

Figure 13:
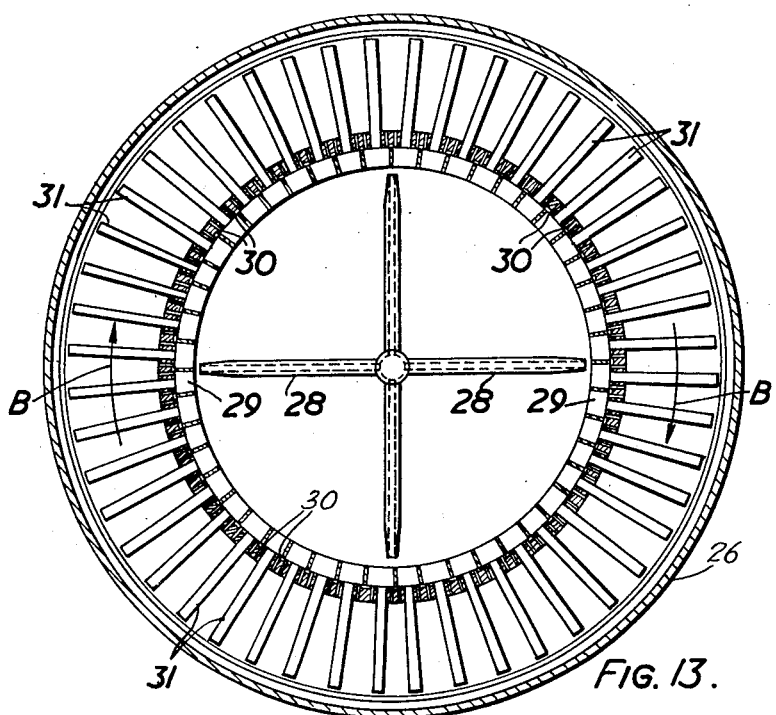
Figure 13 is a transverse section on the line XIII—XIII of Figure 14.

The principle of the invention will appear from Figures 1 to 6, of which Figure 1 is a longitudinal section through a cylindrical combustion duct 1 across the diameter of which is mounted an elongated vaporizer body in the form of a rod 3 which may be of cylindrical section as shown in Figure 2. A stream of high velocity air in which liquid fuel is to be burnt is flowing within the duct in the direction of the arrow 2. A supply of liquid fuel is conveyed by piping to the top 4 of the rod 3 from which it may be allowed to flow by gravity over the exterior of the rod 3. Any surplus of fuel which does not burn is collected in a trough 5 and returned to the fuel system.

It will be obvious that when the high velocity air is flowing over the rod 3 the boundary layer will "break away" approximately at the point 6 to form a wake indicated at 6a involving reverse flow. A continuous film of fuel 7 is maintained over the surface of the rod 3 and assuming the presence of a suitable means of ignition to apply heat (e. g. a small flame or spark) at any point in the vortex wake 6a it will be found that the film of fuel on the rod 3 will ignite and burn as a flame 8 which will usually be of approximately V-shape.

During combustion evaporation of fuel takes place from the whole surface of the cylindrical rod 3 and the vapor from the leading face of the rod mixes with oncoming air and meets hot combustion products and vapor which have been circulated in the vortices in the wake of the rod. Heat from the flame 8 is transferred to the rod 3 and thus provides the necessary latent heat to evaporate more fuel, so that the combustion process continues indefinitely assuming a continuous supply of fuel. The term "rod" includes any form of cross section which will produce turbulent flow as opposed to streamline flow. Possible suitable sections of rod are circular (Figure 2), triangular (denoted by 3' in Figure 3), semi-circuit (denoted by 3" in Figure 4) or approximately arrowhead shape (denoted by 3''' in Figure 6) the last mentioned being thought to be specially suitable to give a high combustion rate per unit frontal area. It is desirable in practice that the trailing edge of the vaporizer rod should not be wetted by fuel, so that the heat which is taken from the flame is used in vaporizing fuel from the leading edge into the boundary layer rather than from the trailing edge into the vortices. In Figures 3, 4 and 6, reference numeral 7 indicates a film of fuel maintained only over the upstream parts of the rod, which may be advantageous for the reason indicated. In Figure 6 the rod has a tail end 9. The vortex flow of hot gases in the wake is indicated at 10 and the arrows 11 denote the heat transferred from the hot trailing surface of the rod. Whatever section of rod is employed (and it is not implied that those just described represent the only suitable sections) the point of boundary layer break-away is so placed that the gases in the vortex are not cooled excessively by a tail fin if any such as 9 or by some other relatively cool body, otherwise the flame may go out or only ignite further downstream. Figure 7 illustrates at 3″″ an undesirable section from this point of view.

It will be observed that the air reaching the vaporizer rod can be at its maximum velocity, and that unlike various known combustion systems, the combustion zone does not require to be divided into regions of primary and secondary combustion by partitions, baffles etc.

The rod instead of being perpendicular to the air stream may be oblique as shown in Figure 20, and with such an arrangement the spread of the fuel over the rod will be assisted by the frictional effect of the air flow, which has a component of force in the direction of the rod.

For simplicity the combustion duct has been hitherto described as only having a single vaporizer body in the form of a rod. Usually in practice, however, there would be a number of similar rods (e. g. of about 1/8″ diameter) arranged, say about 1/4″ apart, in a row or rows, for example as in Figures 8a, 8b and 8c and it will be understood that all the features hitherto described with reference to a single rod may where suitable be applied to rows of rods.

The amount of fuel burnt per unit weight of air passing through the system may be controlled in the following ways:

(1) *By moving the rods.*—The rods may be mounted for pivoting about a shaft 20 (Figure 4) in directions as indicated by the double-headed arrow, so that different faces are presented to the air stream. Figure 5 shows the shaft 20 mounted for pivoting and shows a gear mechanism 65 driven by an electric motor 66 for imparting such pivoting movement. Alternatively some or all of the rods in a row may be slidable further into or out of the air stream so that a larger or smaller area of rod is exposed, as illustrated in Figure 9, the movement being indicated by the double-headed arrow. Alternatively individual rods or a set of rods may be moved relatively so that the altered pattern of air flow through them results in a different rate of burning, or so that some rods gain extra heat from the flames of others. As a still further alternative the total number of rods in the air stream may be varied.

Figure 10 provides an alternative means of reaching the same result as in Figure 9. In Figure 10 slidable sheath elements 17 are provided around the rod 3. The sheath elements 17 may be moved to expose more or less of the rod. The rods 3 are held in position by a bracket 18 carried by the duct wall 1.

(2) *Variation of the air flow.*—The direction of flow of the air over the rods may be altered by means of movable stator vanes in the duct, for example by pivotable stator vanes 21 in Figure 12.

(3) The rods or some of them may be heated or cooled by the passage through them of a heating or cooling fluid, for example through passages such as 19 in Figure 3. For this purpose hot gases or cooling water might be used. A relatively small amount of heating or cooling by extraneous means would be necessary.

The heating or cooling fluid is conducted to the passage 19 by a conduit 54. Although the passage 19 has been shown only in Figure 3, any cross-section of rod may be cooled or heated in this way.

In the case of light distillate fuels e. g. kerosene, which give rise to little carbon and ash deposition, no special cleaning devices may be needed for the rods. However, for heavier fuels and burners operating for long periods it will be necessary to free the rods of deposit without extinguishing the flame. For this purpose the burner rods may be free to be slid axially in the direction of the double-headed arrow through a scraper situated at the side of the combustion chamber, as in Figure 11 where 24 indicates the scraper. Although a scraper has not been shown in any other figure, one may be used with any of the rods illustrated. As indicated, the overall length of the rod should be such that in sliding a used length of rod out of the duct a fresh length is positioned right across the duct. The flame may thus remain unextinguished. Alternatively the rods may be fixed and the scraper 24 slidable. The burner rods may consist of flexible filaments, such as wire or tape 25 (Figure 12) mounted for movement (in the direction of the arrow) on roller or pulley means 25a, so that the rods may be moved across the duct from time to time to permit cleaning.

It is believed that the invention will be particularly useful for the combustion systems of continuous combustion gas turbine plants, or propulsive duct apparatus (ramjets), or possibly also to furnace or similar industrial oil-burning installations.

Figure 14:
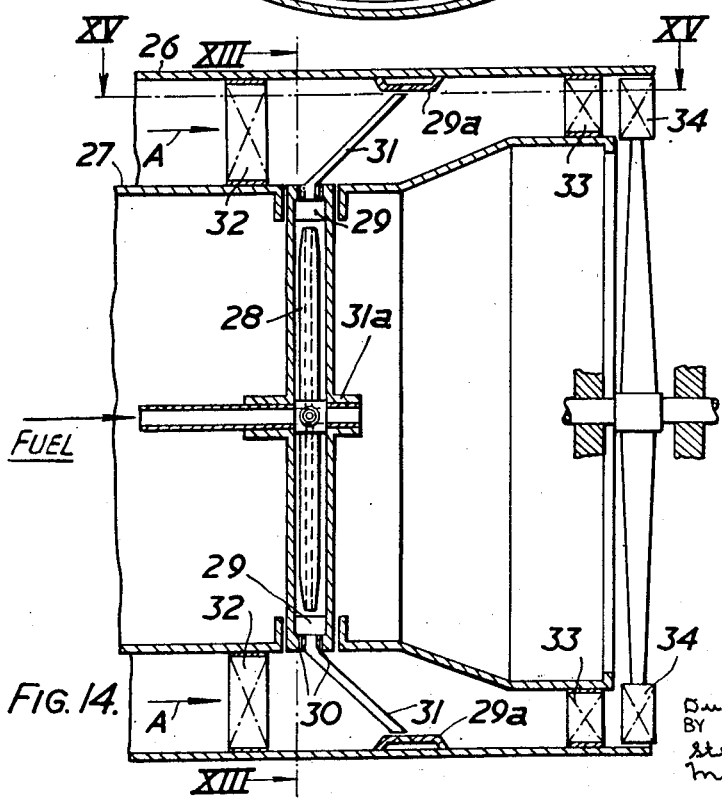
Figure 14 is a longitudinal section through an annular combustion chamber suitable for a gas turbine aero engine.

For aircraft gas turbine engines annular combustion systems as shown in Figures 13 and 14 may be particularly suitable. In these figures the annular combustion duct or chamber comprises the space between an outer cylindrical wall 26 and an inner wall 27. Vaporizer rods 31 are arranged to extend radially and form an annular assembly which is rotatable on bearing means 31a. The rods 31 are obliquely set (see Figure 14) in such manner that the air flow as indicated by the arrow A tends to assist in spreading the fuel film over the rods. The rotary assembly referred to also comprises an annular series of fuel receiving buckets 29 one for each rod 31. Around the radially inner end of each rod 31 there are holes 30 communicating with the interior of the bucket 29, through which holes fuel flows to the surface of the rod. In the example illustrated the assembly of rods and buckets is rotated in the direction of arrows B by swirl imparted to the air flow by stator vanes 32. The turbine stator and rotor blades are indicated downstream at 33, 34 (see Figure 15).

Within the rotary annulus is located a stationary fuel spraying unit comprising approximately radial spray pipes 28 which direct fuel into the buckets 29. In operation it will be appreciated that fuel received by the rotating buckets will be spread outwardly over the rods 31 by centrifugal force assisted by the frictional effect of the air flow on the fuel. Reference 29a denotes a fuel collecting annular trough from which any surplus fuel thrown off the vaporizer rods may be removed.

Figure 16:
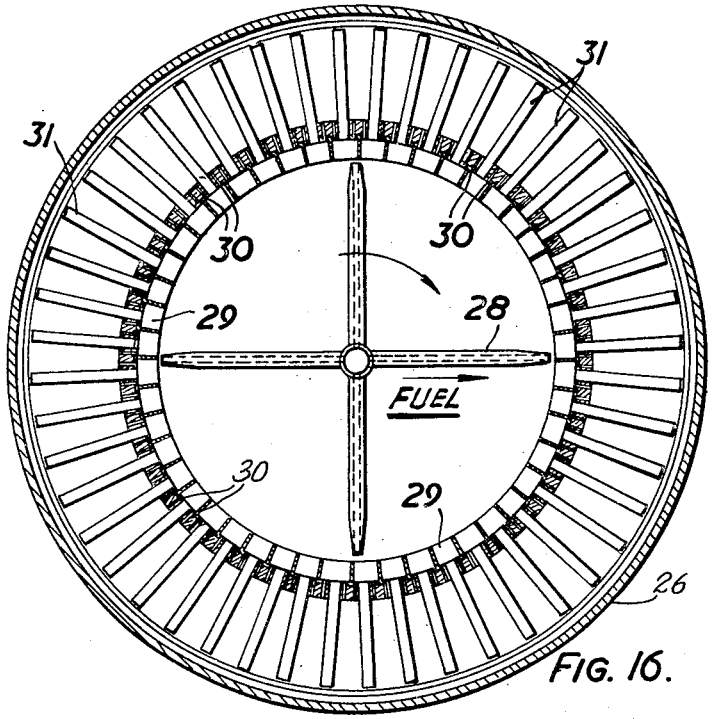
Figures 16 and 17 are views similar to Figures 13 and 14 respectively but showing a modified construction of an annular combustion chamber, Figure 16 being a section on the line XVI—XVI in Figure 17.
Figure 17:
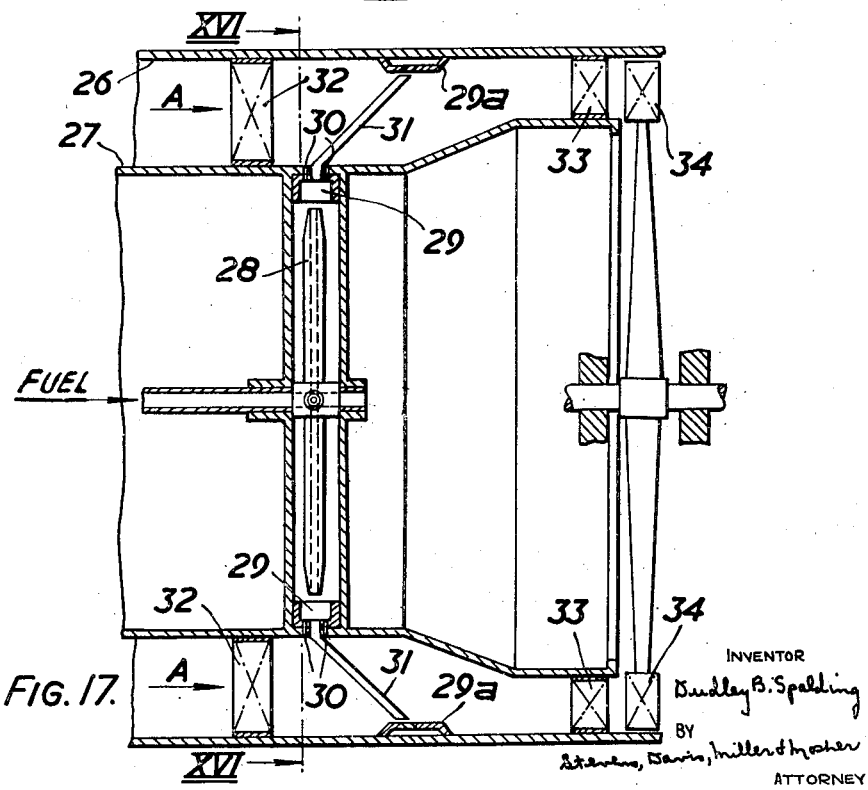

In an alternative construction the rod and bucket assembly may be stationary while the fuel jet assembly 28 is rotary. In such a case it would be necessary to rely solely upon the frictional effect of the gas flow to spread the film of fuel over the rods 31. This is shown in Figures 16 and 17 which correspond with Figures 13 and 14 respectively, the same reference numerals being employed where applicable.

Figure 20 shows a possible construction of annular system generally similar to that just described, except that the buckets 29 are located at the radially outer ends of the vaporizer rods 31, and the fuel jets (of which one is indicated at 28) spray inwardly into the buckets. In this case the fuel jet assembly is rotary. The assembly formed by the rods 31 and the buckets 29 is non-rotary. The slope of the rods 31 is in the direction which allows the fuel to be spread over them by the frictional effect of the gas flow, shown in Figure 20 by arrow A.

Figures 22–23 show an example of another type of system for effecting combustion in an annular duct. The burner assembly comprises vaporizer bodies in the form of rings 40 held together by spokes 41 to form a wheel rotatable about a central shaft 67 driven by a turbine or a motor 68. Each ring has the transverse section shown in Figure 23. Radial fuel pipes 42 expel fuel more or less tangentially through jets 43 into the hollows 40a of the members 40, in which it is maintained by centrifugal force and forms the film from which evaporation takes place (see Figure 23).

The invention may be applied either to main or reheat combustion systems of gas turbine propulsive ducts and the like. Figures 18 and 19 show diagrammatically a reheat combustion system according to the invention. A turbine 55 exhausts into a tail pipe of the engine. Within the tail-pipe 35 there is a conventional exhaust cone 36 towards the rear end of which is mounted a series of radial vaporizer rods 37 (similar to the rods 31), but in this case the rods 37 may be moved inwards about pivot points 37a on the cone 36 so that they may lie in inoperative position substantially flush with the cone 36, or alternatively may be spread radially outwards in the operative position, after the manner of the spokes of an umbrella by means of ribs 56 pivoted to the rods 37. The ends of the ribs 56 remote from the rods 37 are moved axially of the duct by a fluid operated piston mechanism 57 operated by pressure fluid supplied through the pipes 58. In such construction it is necessary to employ a rotary fuel jet assembly such as 38, the fuel flowing in the direction of arrow D, through a passage at the pivot onto the rods 37. The fuel jet assembly 38 rotates in the direction of arrow E in Figure 19, e. g. by means of the turbine 55.

Hitherto it has been assumed that the film of fuel is supplied directly to the vaporizer body or bodies. As an alternative to this however it may be possible to introduce the fuel in the form of a spray at a point upstream of the vaporizer body or bodies so that the fuel droplets are carried downstream by the gas to impinge on the body or bodies and maintain thereon the film of fuel which is required in combustion according to the present invention. With such an alternative, the rods (or other elongated vaporizer bodies) should be so positioned that they intercept the fuel droplets of the spray. The location of the spray nozzle and character of the spray produced thereby should be such that there is substantially no vaporization of fuel upstream of the vaporizer body or bodies. The fuel/air ratio might be altered by varying the amount and/or the distribution of fuel injected, rather than by moving the vaporizer bodies etc. The alternative system of fuel introduction may be of quite general application within the scope of the present invention. Figure 21 illustrates the system, 1 denoting a duct through which a stream of combustion-supporting air is flowing, 3 being elongated vaporizer bodies extending transversely across the duct and 39 being the spray nozzle.

What I claim is:

1. Apparatus for burning liquid fuel in a ducted stream of combustion-supporting gas, comprising an outer wall and an inner wall defining together an annular space constituting the said duct, a plurality of elongated vaporizer bodies spaced apart from each other and positioned within the duct, the said bodies each presenting an unstreamlined profile to the oncoming gas so that a turbulent wake is created in the rear of the body, means for continuously supplying fuel to wet at least part of the external surface of each body to form a continuously maintained wet film thereon, mounting means for said bodies and said fuel supply means to permit relative rotation between the bodies as a whole and said fuel supply means, and means to effect said relative rotation, whereby, when gas is flowing in the duct, fuel evaporates from the wet films on the bodies and when ignited burns only in the turbulent wake of each body.

2. Apparatus for burning liquid fuel in a ducted stream of combustion-supporting gas, comprising an outer cylindrical wall and a concentric inner cylindrical wall defining between them an annular space constituting the said duct, a plurality of elongated vaporizer bodies radiating transversely of the duct, the said bodies each presenting an unstreamlined profile to the oncoming gas so that a turbulent wake is created in the rear of the body, a plurality of fuel-receiving receptacle means each positioned adjacent one end of one of said bodies, a fuel-supply unit positioned to deliver jets of fuel into the said receptacle means, fuel-conveying means connecting the said receptacle means and the external surfaces of the bodies, mounting means to permit relative rotation between the bodies and said receptacle means as a whole and the fuel-supply unit, and means to effect said relative rotation, so that fuel may be supplied to the bodies in circumferential succession to wet at least part of the external surfaces of the bodies, to form continuously maintained wet films thereon, whereby, when gas is flowing in the duct, fuel evaporates from the wet films continuously maintained on the bodies and when ignited burns only in the turbulent wake of each body.

3. Apparatus as claimed in claim 2 in which the said receptacle means are positioned adjacent the radially inner ends of the said bodies and in which the fuel-supply unit is so located as to deliver jets of fuel in radially outward directions.

4. Apparatus as claimed in claim 2 in which the said receptacle means is associated with the radially outer ends of the said bodies and in which the fuel-supply unit is so located as to deliver jets of fuel in radially inward directions.

5. Apparatus as claimed in claim 2 in which there is a rotary assembly comprising the said bodies as a whole, the said fuel-receiving receptacle means and the said fuel-conveying means and in which the fuel-supply unit is stationary.

6. Apparatus as claimed in claim 5 in which there is stator blading positioned between the duct-forming walls upstream of the said vaporizer bodies, for imparting to the gas stream a swirling motion effective to rotate the said assembly.

7. The combination of combustion apparatus as claimed in claim 2 with a gas turbine, the gas turbine being so positioned downstream of the said vaporizer bodies for rotation by the said gas stream.

8. Apparatus for burning liquid fuel in a ducted stream of combustion-supporting gas, comprising an outer cylindrical wall and a concentric inner cylindrical wall defining between them an annular space constituting the said duct, a plurality of elongated vaporizer bodies radiating transversely of the duct, the said bodies each presenting an unstreamlined profile to the oncoming gas so that a turbulent wake is created in the rear of the body, fuel-receiving receptacle means positioned adjacent one end of said bodies, a fuel-supply unit positioned to deliver jets of fuel into said receptacle means, fuel-conveying means connecting said receptacle means and the external surfaces of the bodies, mounting means to permit relative rotation between the bodies as a whole and the fuel-supply unit, means to effect said relative rotation, so that fuel may be supplied to the bodies to wet at least part of the external surfaces of the bodies, to form continuously maintained wet films thereon, whereby, when gas is flowing in the duct, fuel evaporates from the wet films continuously maintained on the bodies and when ignited burns only in the turbulent wake of each body, and means for moving at least some of the bodies into and out of their operative positions across the duct.

9. Apparatus for burning liquid fuel in a ducted stream of combustion-supporting gas comprising an outer cylindrical wall and a concentric inner cylindrical wall defining together an annular space constituting the said duct, a plurality of elongated vaporizer bodies in the form of concentric rings and each presenting an unstreamlined profile to the oncoming gas so that a turbulent wake is created in the rear of the body, mounting means for said rings to permit rotation of the rings as a unit, means to rotate said unit and means for delivering fuel to the surface of the rings to form a continuously maintained film thereon, whereby, when gas is flowing in the duct, fuel evaporates from the film and when ignited burns only in the turbulent wake of each ring.

10. Apparatus for burning liquid fuel in a stream of combustion-supporting gas comprising an annular duct in which the stream of gas flows, a rotatable body mounted co-axially with the duct, a plurality of slender rod-like elements of bluff cross-section attached to the said body for rotation therewith and arranged in at least one row of peripherally spaced elements, each radially extending from the body transversely across the duct and constituting a combined fuel vaporizer and flame-stabilizing baffle, means for rotating the body, means for introducing fuel in a film to the outer surface of each element, which film during rotation of the body and the elements spreads under centrifugal force over at least part of the said outer surface and ignition means positioned in the duct immediately down-stream of the said elements.

11. Apparatus for burning liquid fuel in a stream of combustion-supporting gas comprising an annular duct in which the stream of gas flows, a rotatable body mounted co-axially with the duct, a plurality of slender rod-like elements of bluff cross-section attached to the said body for rotation therewith and arranged in at least one row of peripherally spaced elements, each radially extending from the body transversely across the duct and constituting a combined fuel vaporizer and flame-stabilizing baffle, means for rotating the body, radially directed fuel-conveying passageways in the said body each having its radially outer end positioned adjacent the outer surface of an element at the radially inner end thereof and directed to discharge fuel in a film onto the said outer surface, which film during rotation of the body and the elements spreads under centrifugal force over at least part of the said outer surface, fuel duct means within the said body for conveying fuel from an external supply to the said passageways and ignition means positioned in the duct immediately down-stream of the said elements.

References Cited in the file of this patent

UNITED STATES PATENTS

| | | |
|---|---|---|
| 709,941 | Trapp | Sept. 30, 1902 |
| 1,639,744 | Misch | Aug. 23, 1927 |
| 1,677,371 | Roth | July 17, 1928 |
| 2,170,480 | Merritt | Aug. 22, 1939 |
| 2,326,072 | Seippel | Aug. 3, 1943 |
| 2,385,833 | Nahigyan | Oct. 2, 1945 |
| 2,479,776 | Price | Aug. 23, 1949 |
| 2,483,045 | Harby | Sept. 27, 1949 |
| 2,625,788 | Neikirk et al. | Jan. 20, 1953 |
| 2,625,795 | Brzozowski | Jan. 20, 1953 |
| 2,636,344 | Heath | Apr. 28, 1953 |
| 2,657,532 | Reid et al. | Nov. 3, 1953 |
| 2,659,196 | Brown | Nov. 17, 1953 |

FOREIGN PATENTS

| | | |
|---|---|---|
| 620,057 | Great Britain | Mar. 18, 1949 |
| 471,326 | Germany | Feb. 11, 1929 |